(12) United States Patent
Zelman

(10) Patent No.: US 7,384,141 B2
(45) Date of Patent: Jun. 10, 2008

(54) AUXILIARY AND PRIMARY EYEWEAR WITH EASY RELEASE SNAP CONNECTION

(76) Inventor: Gary Martin Zelman, 997 Flower Glen Rd., Simi Valley, CA (US) 93065

(*) Notice: Subject to any disclaimer, the term of this patent is extended or adjusted under 35 U.S.C. 154(b) by 77 days.

(21) Appl. No.: 11/418,036

(22) Filed: May 3, 2006

(65) Prior Publication Data

US 2007/0258036 A1 Nov. 8, 2007

(51) Int. Cl.
*G02C 7/08* (2006.01)
*G02C 5/00* (2006.01)

(52) U.S. Cl. .................... 351/57; 351/47; 351/140
(58) Field of Classification Search .............. 351/47, 351/48, 57, 58, 140–152
See application file for complete search history.

(56) References Cited

U.S. PATENT DOCUMENTS

| 4,685,782 | A |   | 8/1987  | Lhospice |          |
|-----------|---|---|---------|----------|----------|
| 5,367,742 | A | * | 11/1994 | Bindman  | 16/87.2  |
| 5,894,335 | A | * | 4/1999  | Hoffman  | 351/47   |
| 5,929,964 | A | * | 7/1999  | Chao     | 351/47   |
| 6,196,679 | B1|   | 3/2001  | Wong     |          |
| 6,502,940 | B1| * | 1/2003  | MacIntosh, Jr. | 351/110 |
| 6,623,114 | B2|   | 9/2003  | Lin      |          |

OTHER PUBLICATIONS

Manhattan Design Studio, "Takumi Magnetic Eyewear" sales catalog (pp. 43-75), (app.) Oct. 1997, New York, New York.

* cited by examiner

*Primary Examiner*—Huy K Mai
(74) *Attorney, Agent, or Firm*—Trojan Law Offices

(57) ABSTRACT

Eyeglasses having a lens frame removably attached to a primary eyewear using easy release snap connection that provides effective resistance from said lens frame from becoming involuntarily detached from said primary eyewear. This arrangement allows the user to maximize the different kinds of eyewear.

19 Claims, 9 Drawing Sheets

AUXILIARY AND PRIMARY EYEWEAR WITH EASY RELEASE SNAP CONNECTION

BACKGROUND OF THE INVENTION

1. Field of the Invention

This invention relates to eyewear and eyeglasses and a method of using said eyewear and eyeglasses, which provide a lens frame removably attached to a primary eyewear, such as an eyewear platform or conventional eyeglasses, with snap connections.

2. Background Information

Auxiliary eyewear attachments, which connect to primary or conventional eyeglasses with attachment devices, allow the user to convert a pair of conventional eyeglasses to sunglasses and to avoid the need for an additional pair of prescription sunglasses. This auxiliary eyewear can also be used to change the prescription of the lenses on the primary eyewear.

Another way to allow the user to maximize the different kinds of eyewear is for the user to attach a removable lens frame to an eyewear platform. By allowing removable attachment of the lens frame to an eyewear platform, the user only needs to wear one set of lenses at a time. By only using one set of lenses in this eyewear, there is reduced weight, no glare or reflection between lenses, and no distraction in the field of vision with the eyewear. In addition, since there is only one set of lenses, it is easier for the user to keep these lenses clean. Further, by using the same eyewear platform as a base to attach different lenses, the user is able to employ one eyewear apparatus that allows for multiple and different types of lenses and that can be changed easily and quickly. Finally, instead of having several different pairs of conventional glasses, the user may substantially save cost by having different sets of lenses for one eyewear platform.

A number of different designs are available for auxiliary eyewear using attachment devices such as magnets, clips, snaps, clasps, or hooks. A method of attaching auxiliary eyewear by snaps is shown and described in U.S. Pat. No. 6,196,679 B1 issued Mar. 6, 2001 to Edmund Wong. In the Wong patent, each of a pair of projections on the auxiliary frame engages and fits snugly in an opening on a corresponding projection on the primary spectacle frame. In order to allow the auxiliary projections to fit snugly in the openings, Wong uses an incomplete ring clip received and retained in an annular recess of the opening's inner surface.

A problem with the attachment device disclosed and described in Wong is that as a user repeatedly attaches and detaches the auxiliary eyewear, the incomplete ring clip can become loosened or worn out and lose its ability to secure locking engagement between the auxiliary projection and the primary projection. Further, manufacture of the eyeglasses with such incomplete ring clip inserted in the inner surface of the opening is relatively complex and requires separate pieces of material.

Moreover, the process of detachment of the auxiliary eyewear from the primary eyeglasses in Wong is inconvenient. In order to release the locking engagement between the auxiliary projection and the primary projection, a user has to forcibly pull the auxiliary projection from the primary projection. If the user tries to detach the auxiliary eyewear while wearing the assembly of the primary glasses and the auxiliary eyewear, pulling the auxiliary eyewear from the primary eyeglasses may cause severe dislocation of the primary eyeglasses, and may result in injury to the user's face.

It is, therefore, one object of the present invention to provide a new and improved snap connection for attaching auxiliary eyeglasses to a primary eyewear, which is stable and durable in its structure.

Another object of the present invention is to provide a method and apparatus of easy release snap connection that allows a user to comfortably and conveniently detach an auxiliary eyewear from a primary eyewear.

SUMMARY OF THE INVENTION

The purpose of the present invention is to provide an eyewear apparatus and a method that provides a lens frame removably attached to a primary eyewear, such as conventional eyeglasses or an eyewear platform, by snap connection that effectively prevents the removable lens frame from becoming involuntarily detached from the primary eyewear and that is conveniently and comfortably releasable.

In the present invention, an apparatus for attaching a lens frame to a primary eyewear comprises a first snap connector and a second snap connector. The first snap connector has a male portion, and the second snap connector has a female portion. The female portion can be located in proximity to each temple extension of a primary eyewear, and the male portion can be placed in a corresponding location of a lens frame for mating with the female portion. Alternatively, the male portion can be located in proximity to each temple extension of a primary eyewear, and the female portion can be placed in a corresponding location of a lens frame for receiving the male portion.

Specifically, the female portion can be located in a temple socket that is attached to each temple extension of the primary eyewear, for receiving the male portion located in an appendage socket of the lens frame. The female portion is defined by an inner wall of the second snap connector, which has a first ridge and a second ridge on its inner surface. The second snap connector further comprises a button for comfortably releasing the male portion from the female portion. The button comprises a cap and a pillar, and the pillar is capable of sliding in and out of the female portion. The button has a button ridge to engage a first ridge located in proximity to an upper area of the inner wall in order to limit further sliding movement of the button. The movement of the button is also limited by the cap, which sits on the top surface of the temple socket.

The male portion located in the appendage socket of the lens frame comprises a compressible head and a body. The male portion has at least one cut formed substantially along the length of the male portion so that the head is split into multiple segments. The segments are spaced apart each other when the male portion does not mate with the female portion. Because of the space formed between the segments, the head is compressible. Preferably, the male portion further comprises a recess located between the body and the head. Upon insertion of the male portion into the female portion, the head is temporarily compressed to pass through the second ridge of the inner wall. Upon passing the second ridge, the head returns to its approximate original width. The recess fictionally engages the second ridge and, consequently, the male portion is securely locked within the female portion. In order to release the snap connection, a user presses the button, which then pushes out the male portion.

In another embodiment, the inner wall of the second snap connector has a protruding area, which is located in a substantially upper portion of the inner wall. Upon insertion of the male portion into the female portion, the head of the male portion frictionally engages the protruding area of the inner wall for locking the male portion in the female portion.

The present invention introduces such refinement. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

DETAILED DESCRIPTION OF THE INVENTION

Figure 1:
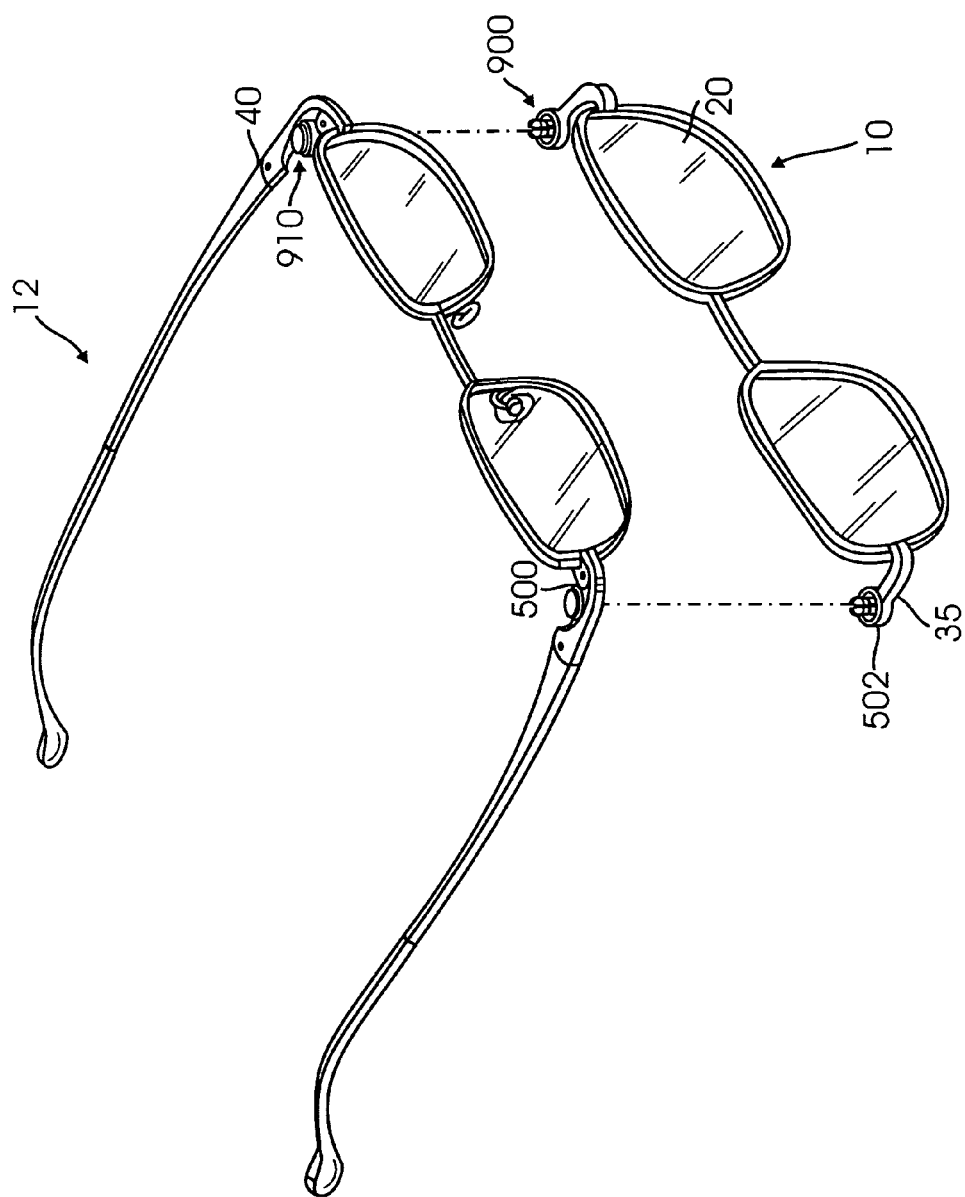
FIG. 1 is an exploded view of the first embodiment of a removable lens frame and conventional eyeglasses with easy release snap connections.

FIGS. 1 through 11 show embodiments of easy release snap connection for attaching a lens frame to a primary eyewear, such as conventional eyeglasses or an eyewear platform.

As shown in FIGS. 1 through 11, the present invention for attaching a lens frame to a primary eyewear comprises a first snap connector 900 and a second snap connector 910. The first snap connector 900 has a male portion 640, and the second snap connector has a female portion 630 that is an opening for receiving the male portion 640. The male portion 640 can be located in proximity to each temple extension 40 of a primary eyewear 12 or 15, and the female portion 630 can be placed in a corresponding location of a lens frame 10 for receiving the male portion 640. Alternatively, the female portion 630 can be located in proximity to each temple extension 40 of a primary eyewear 12 or 15, and the male portion 640 can be placed in a corresponding location of a lens frame 10 for mating with the female portion 630.

Figure 4:
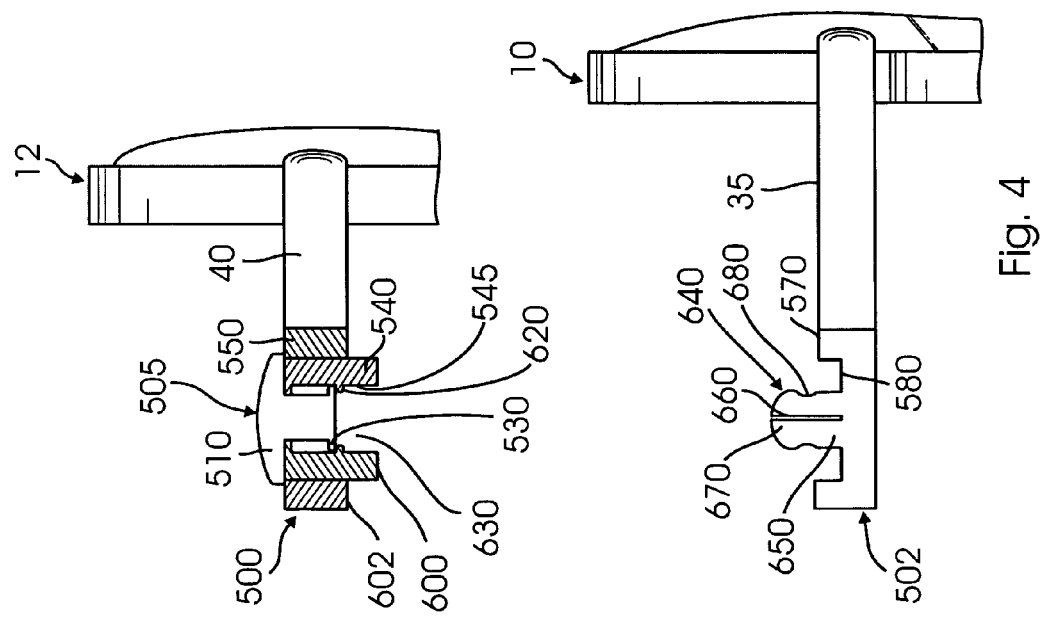
FIG. 4 is a partial cross-sectional side view illustrating the lens frame detached from the conventional eyeglasses.

For example, as shown in FIGS. 1 and 4, the female portion 630 can be located in a temple socket 500 that is attached to each temple extension 40 of a primary eyewear 12, for receiving the male portion 640 located in an appendage socket 502 of the lens frame 10. The female portion 630 is defined by an inner wall 540 that is surrounded by an outer wall 550. The inner wall 540 has a first ridge 610 and a second ridge 620 protruding from its inner surface 545. The first ridge 610 is located in proximity to an upper area of the inner wall 540, and the second ridge 620 is located in proximity to a mid area of the inner wall 540. The height of the inner wall 540 is greater than that of the outer wall 550 so that a first bottom surface 600 of the inner wall 540 is located lower than a second bottom surface 602 of the outer wall 550.

The second snap connector 910 further comprises a button 505 for comfortably releasing the engagement between the first snap connector 900 and the second snap connector 910. The button 505 comprises a cap 510 and a pillar 520, and is seated in the temple socket 500. The width of the pillar 520 is slightly smaller than that of an opening defined by the first ridge 610 so that the pillar 520 of the button 505 can slide in and out of the female portion 630. The movement of the button 505 is limited by a button ridge 530, which engages the first ridge 610 of the inner wall 540 so that the button 505 is not separated from the temple socket 500. The movement of the button 505 is also limited by the cap 510, which has a width greater than that of the opening defined by the first ridge 610 so that the cap 510 can sit on the top surface of the temple socket 500.

Figure 6:
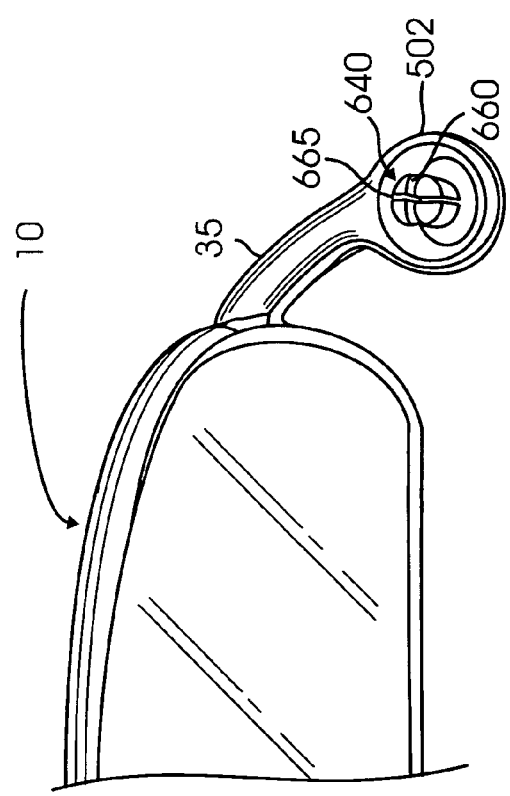
FIG. 6 shows a male portion located in an appendage socket of the lens frame.
Figure 7:
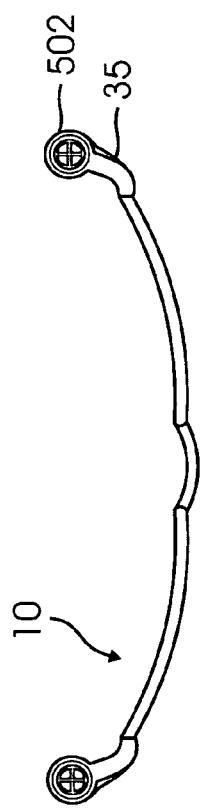
FIG. 7 is a top view of the lens frame with a male portion.
Figure 8:
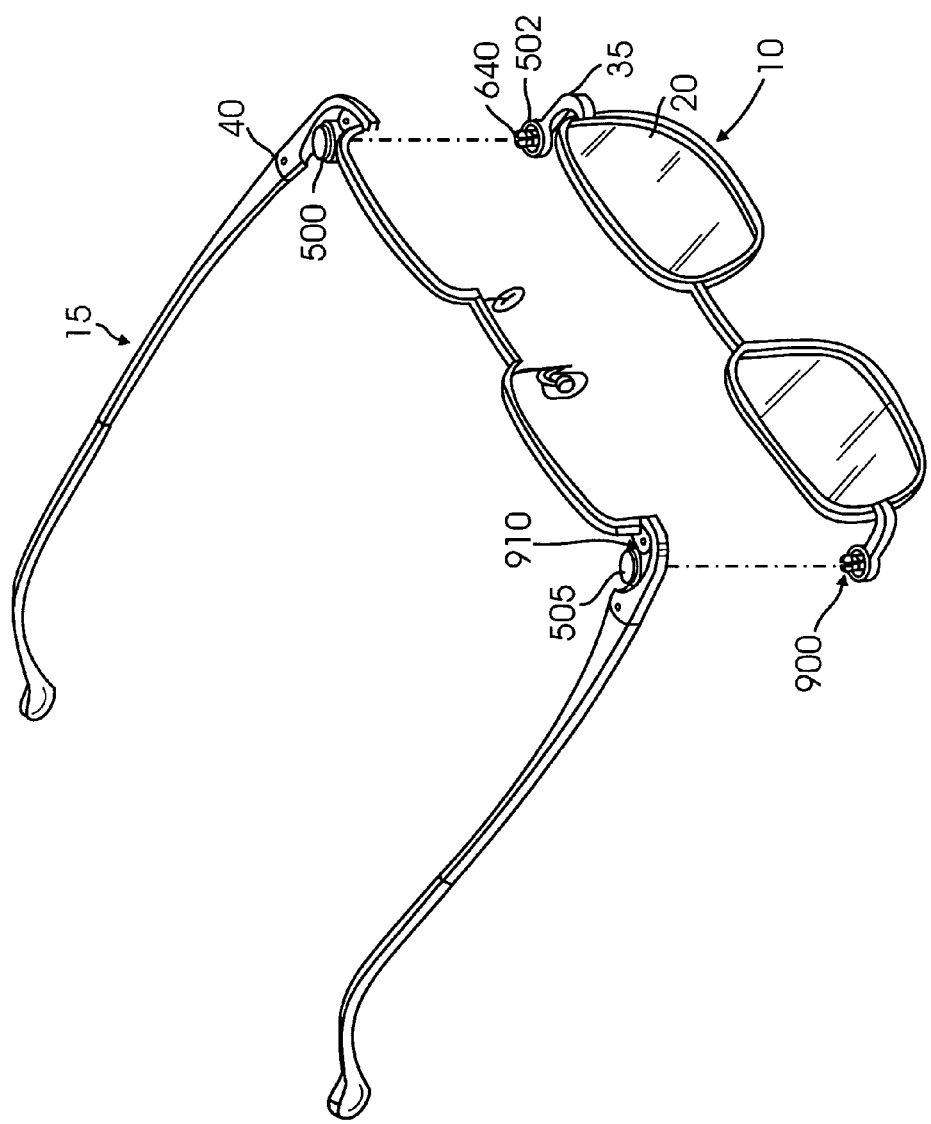
FIG. 8 is an exploded view of another embodiment of a removable lens frame and an eyewear platform with easy release snap connections.

The male portion 640 located in the appendage socket 502 of the lens frame 10 comprises a body 650 and a head 670. Preferably, the male portion further comprises a recess 680 located between the body 650 and the head 670. As shown in FIGS. 6 and 7, the male portion 640 has at least one cut formed substantially along the length of the male portion 640 so that the head 670 is split into multiple segments. There is a space 665 between the segments, and the segments do not contact each other when the male portion 640 is not inserted into the female portion 630. The first surface 580 and the second surface 570 of the appendage socket 502 are proportioned to receive and fully engage the first bottom surface 600 and the second bottom surface 602 respectively of the temple socket 500.

As shown in FIG. 4, when the male portion 640 of the lens frame 10 is not inserted into the female portion 630 of the temple socket 500, the pillar 520 of the button 505 can be located substantially within the female portion 630, and the bottom surface of the cap 510 is substantially in contact with the top surface 590 of the temple socket 500.

Depending on the specific design or need of the user, the head of the male portion and corresponding female portion can be in any shape, including but not limited to, round, cylinder, rectangle, oval, and flat. The head and the body of the male portion can each have a different shape, or can have the same shape. For example, the head can be in a substantially round shape, and the body can be in a substantially cylinder shape. In another example, the head can be in a rectangular shape, and the body can be in a cylinder shape. In still another example, the head and the body together can comprise one piece of a cylinder shape.

Figure 3:
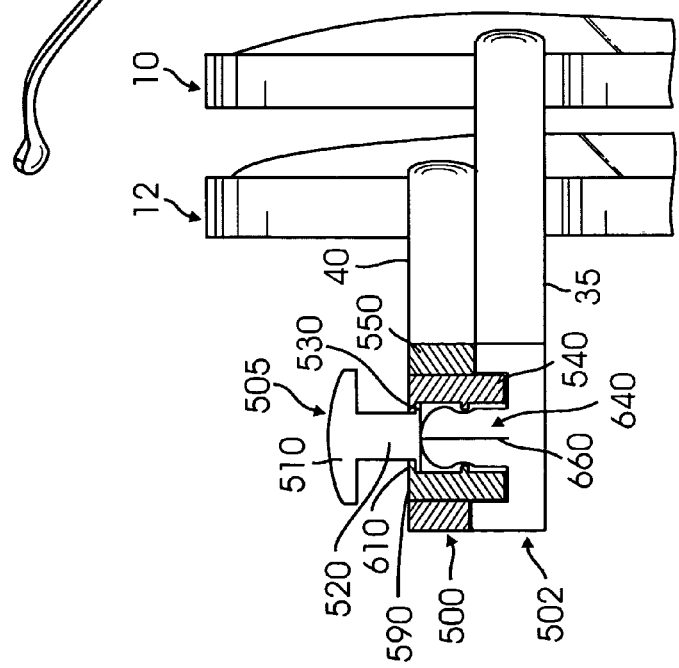
FIG. 3 is a partial cross-sectional view taken at 3-3 of FIG. 2.

Referring to FIG. 3, in order to attach the lens frame 10 to a primary eyewear 12, the male portion 640 of the lens frame 10 is inserted into the female portion 630 of the primary eyewear 12. The width of the head 670 is slightly larger than that of an opening portion defined by the second ridge 620 so that a user has to exercise slight force in order to allow the head 670 to be compressed by and pass the second ridge 620. The head 670 is compressible due to the space 665 made from the cut 660. Upon passing the second ridge 620, the head 670 returns to its approximate original width. In a preferred embodiment, the recess 680 of the male portion 640 is proportioned to engage the second ridge 620, thereby locking the male portion 640 in the female portion 630. In another embodiment, the male portion 640 does not have the recess, and the second ridge 620 can frictionally engage a part of the head 670 for locking the male portion 640 in the female portion 630.

Upon insertion of the male portion 640 into the female portion 630, a top surface area of the head 670 engages a bottom surface area of the button 505. Also, the first bottom surface 600 and the second bottom surface 602 of the temple socket 500 engage the first surface 580 and the second surface 570 respectively of the appendage socket 502. Such engagement and the structure of the depressed first surface 580 allow for greater resistance from horizontal or side-to-side displacement.

In order to release the snap connection, a user presses the button 505, which then pushes out the male portion 640. Except the opening portions defined by the first ridge 610 and the second ridge 620, the female portion 630 has a width slightly greater than that of the head 670, so that once the head 670 passes the second ridge 620 the male portion 640 can freely come out of the female portion 630.

Figure 5:
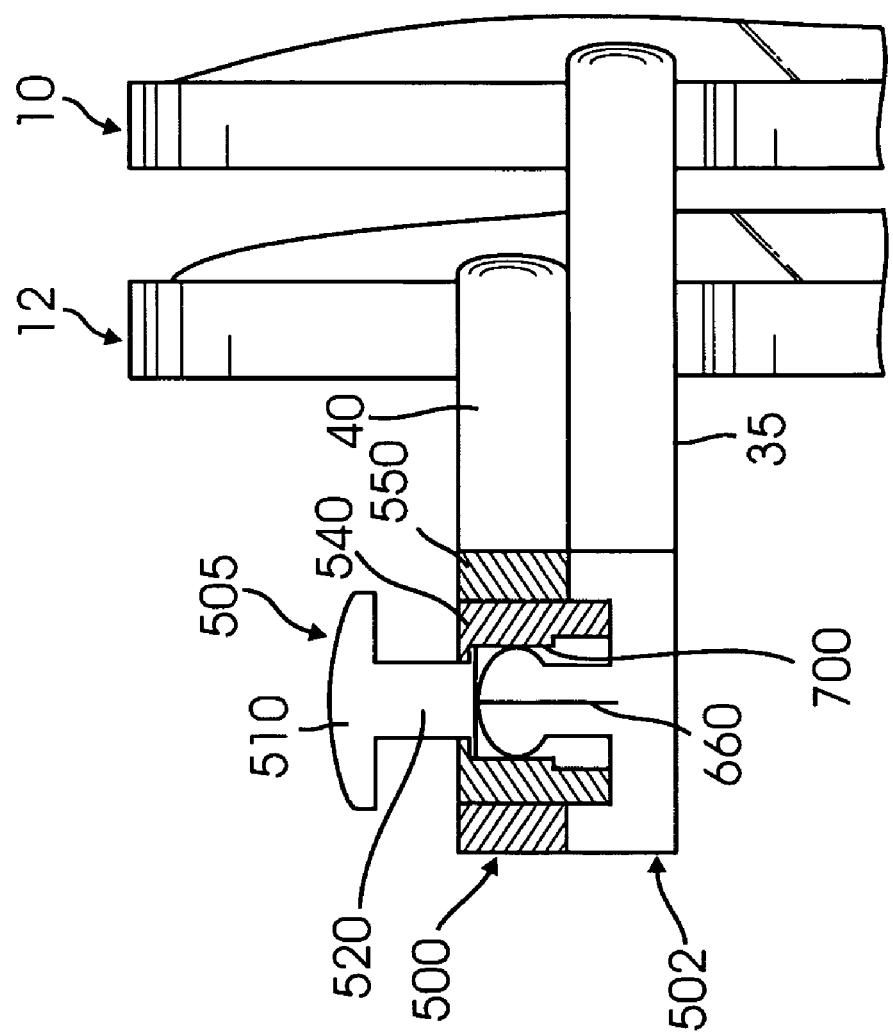
FIG. 5 is a cross-sectional side view of another embodiment of easy release snap connection.

In another embodiment as shown in FIG. 5, the inner wall of the temple socket has a protruding area 700, which is located in a substantially upper portion of the inner wall. Upon insertion of the male portion into the female portion, the head 670 of the male portion frictionally engages the protruding area 700 due to the pressure caused by the resilient property of the compressed head 670 on the surface of the protruding area 700, thereby securely locking the male portion in the female portion.

Figure 2:
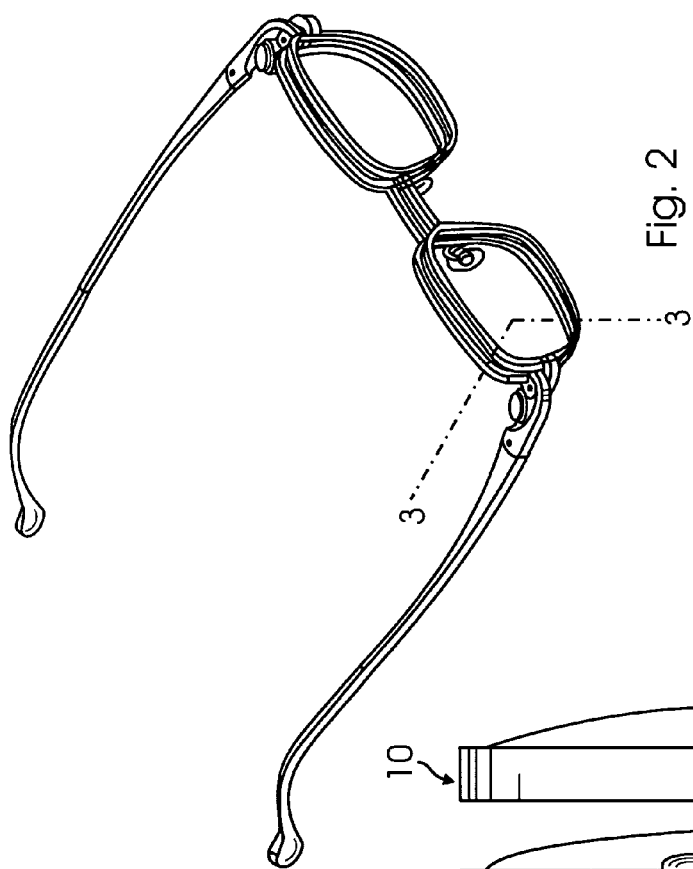
FIG. 2 illustrates the lens frame attached to the conventional eyeglasses by easy release snap connections.
Figure 9:
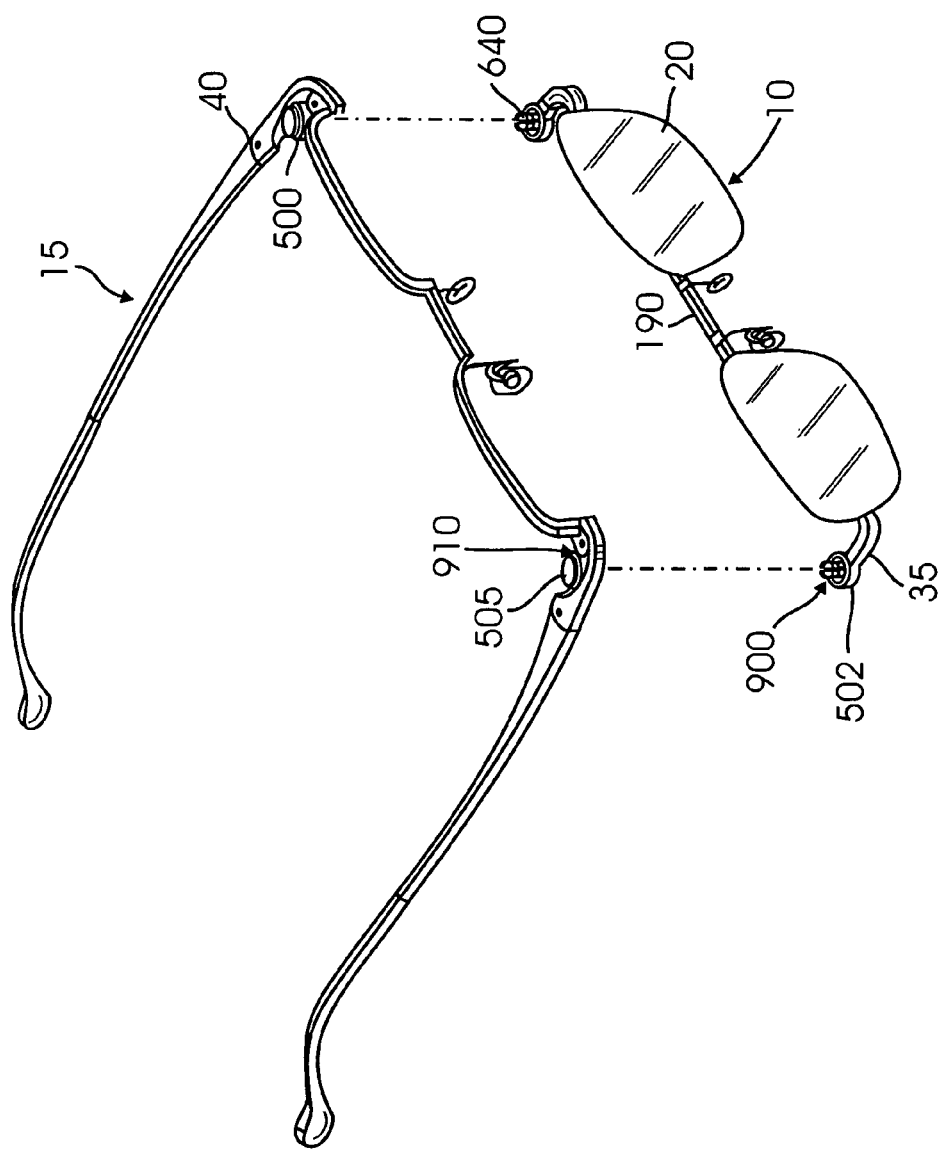
FIG. 9 is an exploded view of another embodiment of a removable lens frame and an eyewear platform with easy release snap connections, where the lenses of the lens frame are connected by a lens connector.

The easy release snap connection can be used for attaching various eyewear frames. For example, a lens frame 10 can be attached by the easy release snap connection to conventional eyeglasses, as shown in FIGS. 1 and 2, or to an eyewear platform 15 as shown in FIGS. 8 through 11. Also, lenses 20 connected by a lens connector 190 can be attached to the eyewear platform 15 by the easy release snap connection as illustrated in FIG. 9.

Figure 10:
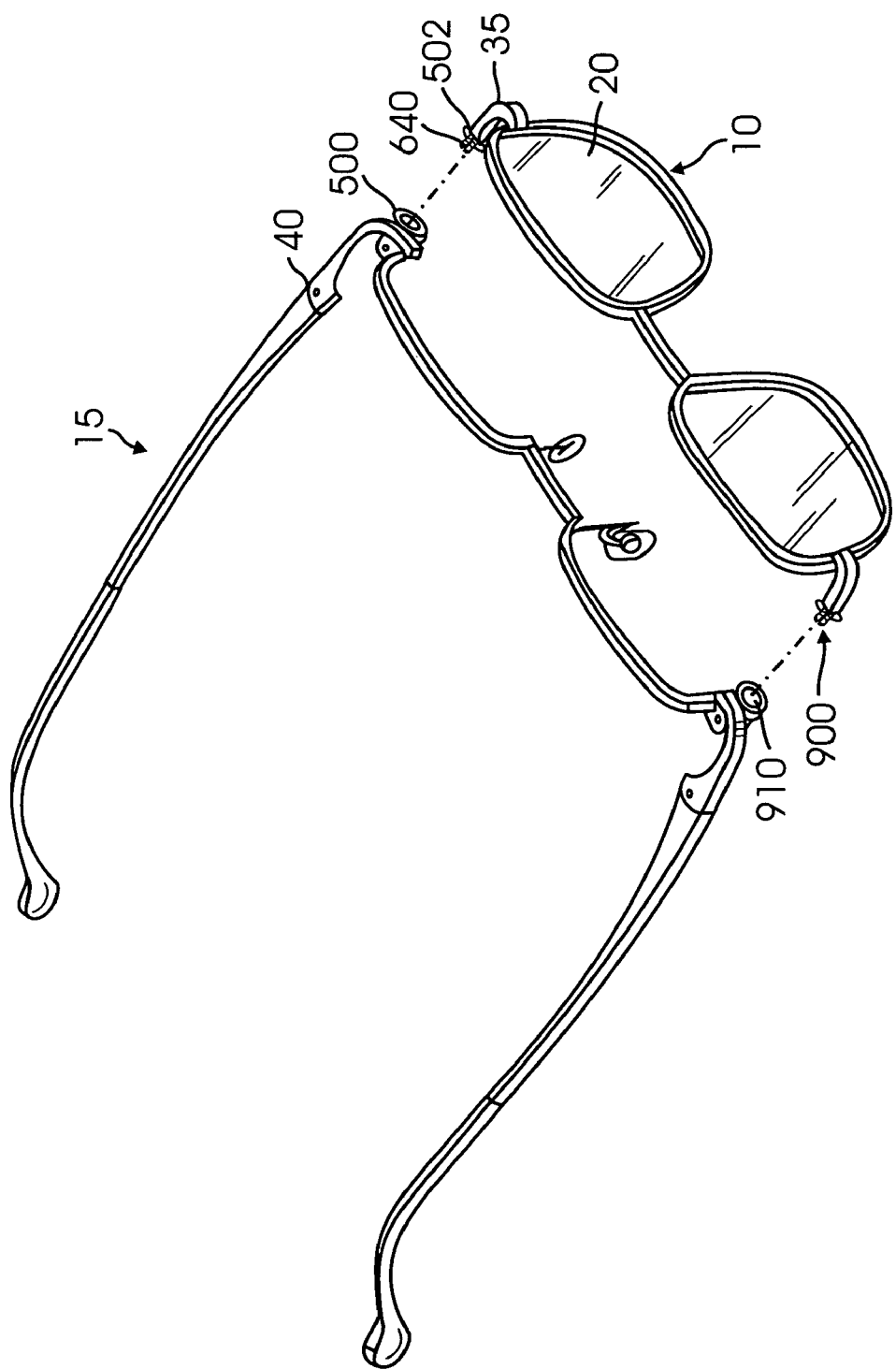
FIG. 10 is an exploded view of another embodiment of a removable lens frame and an eyewear platform with easy release snap connections, where the lens frame is mounted rearwardly from the front.
Figure 11:
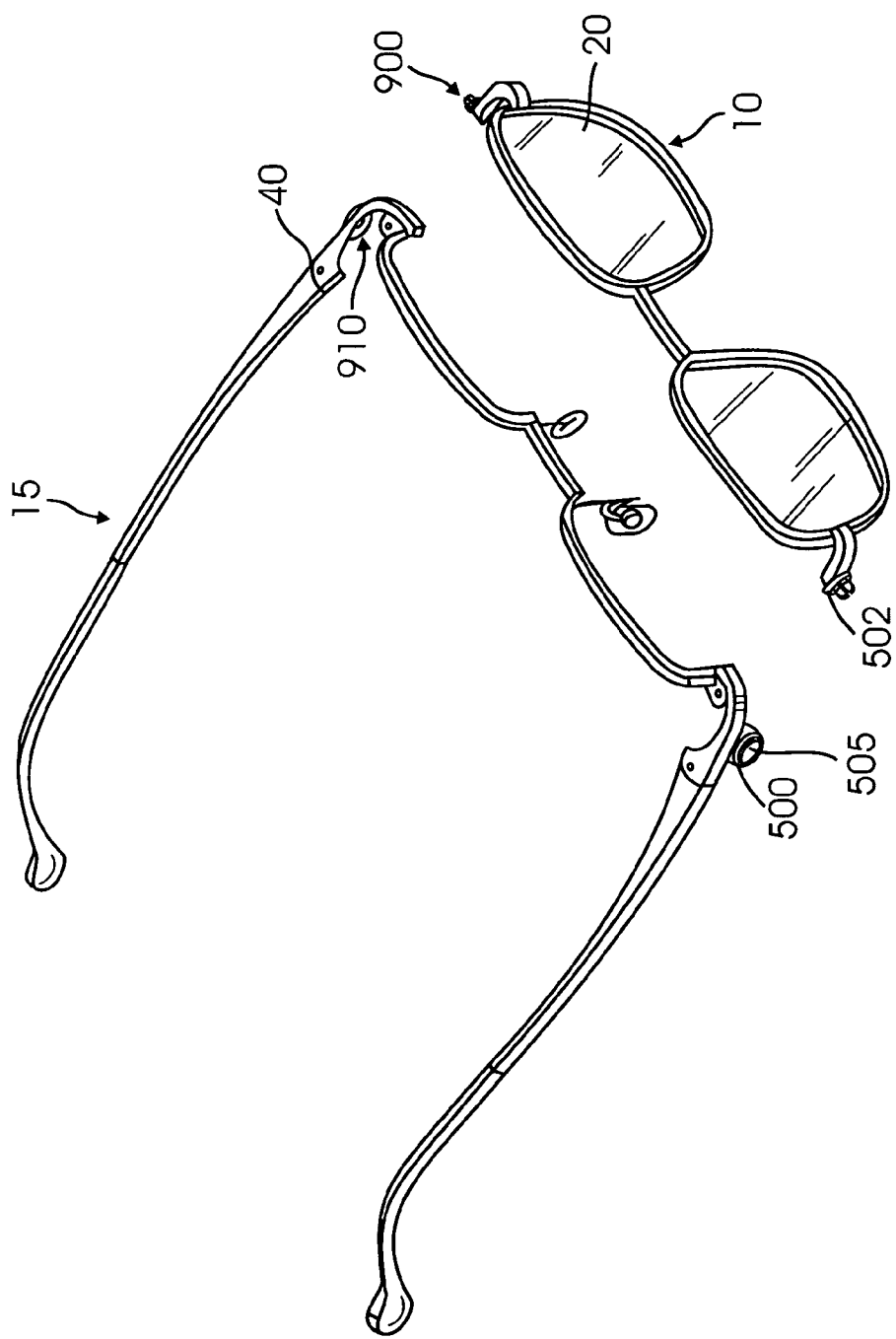
FIG. 11 is an exploded view of another embodiment of a removable lens frame and an eyewear platform with easy release snap connections, where the lens frame is mounted outwardly from the side of each appendage of the lens frame.

The appendage socket 502 can be aligned and mounted in various positions on the lens frame 10, including being mounted horizontally (e.g., FIGS. 1-9) or vertically (e.g., FIGS. 10-11). Alternatively, the male portion 640 can be directly connected to the appendage 35 without the appendage socket.

Similarly, the temple socket 500 can be aligned and mounted in various positions on the temple extension 40, including being mounted horizontally (e.g., FIGS. 1-5, 8-9) or vertically (e.g., FIGS. 10-11). In an alternative, the female portion and the button can be directly constructed in the temple extension 40 without using the temple socket.

Finally, the primary eyewear and the lens frame including the first snap connector and the second snap connector can be made of a variety of materials including but not limited to metals, alloys, carbon fibers, plastics and other lightweight and strong composite materials. In addition, the primary eyewear and the lens frame can also be made of materials that allow a certain amount of resilience, elasticity, or "give" to enable the eyewear to be able to take the rigors of use. Both the primary eyewear and the lens frame can assume a variety of shapes and sizes depending on the specific design or need of the user. Also, both the primary eyewear and the lens frame can be each made of one piece.

While the invention as described in connection with its preferred embodiments, it will be understood that it is not intended to limit the invention to those embodiments. On the contrary, it is intended to cover all alternatives, modifications, and equivalents as may be included within the spirit and scope of the invention as defined by the appended claims.

What is claimed is:

1. An apparatus for attaching a lens frame to a primary eyewear comprising:
   a primary eyewear and a lens frame,
   said primary eyewear having two temple extensions capable of being placed over a user's ears and a bridge portion capable of resting on a user's nose to permit said primary eyewear to be worn by a user,
   said lens frame comprising at least one lens,
   said lens frame having a first snap connector having a male portion, said primary eyewear having a second snap connector having a female portion,
   said female portion located in proximity to each of said temple extensions, said male portion located so as to be capable of mating with said female portion for removably attaching said lens frame onto said primary eyewear,
   said second snap connector having a button for releasing said male portion from said female portion.

2. The apparatus of claim 1, wherein said female portion is defined by an inner wall of said second snap connector.

3. The apparatus of claim 2, wherein at least a part of said button is capable of sliding into and out of said female portion.

4. The apparatus of claim 3, wherein said button has a button ridge to engage a first ridge located in proximity to an upper area of said inner wall for limiting further sliding movement of said button.

5. The apparatus of claim 2, wherein said male portion has at least one cut throughout said male portion so as to be compressible.

6. The apparatus of claim 5, wherein, upon insertion of said male portion into said female portion, at least a part of said male portion frictionally engages at least a part of said inner wall for securely locking said male portion in said female portion.

7. The apparatus of claim 5, wherein said male portion has a head, a body, and a recess located between said head and said body;
   said inner wall having a second ridge located in proximity to a mid area of said inner wall,
   such that, upon insertion of said male portion into said female portion, said head is momentarily compressed to pass said second ridge and, upon passing said second ridge, returns to its approximate original width; and
   said recess being proportioned to engage said second ridge for securely locking said male portion in said female portion.

8. The apparatus of claim 1, wherein said second snap connector is located in a temple socket attached to each of said temple extensions, and said first snap connector is located in an appendage socket attached to each of appendages of said lens frame.

9. An apparatus for attaching a lens frame to a primary eyewear comprising:
   a primary eyewear and a lens frame,
   said primary eyewear having two temple extensions capable of being placed over a user's ears and a bridge portion capable of resting on a user's nose to permit said primary eyewear to be worn by a user, said lens frame having at least one lens, said primary eyewear having a first snap connector having a male portion located in proximity to each of said temple extensions, said lens frame having a second snap connector having a female portion which is located so as to be capable of receiving said male portion for removably attaching said lens frame onto said primary eyewear, said second snap connector having a button for releasing said male portion from said female portion.

10. The apparatus of claim 9, wherein said female portion is defined by an inner wall of said second snap connector.

11. The apparatus of claim 10, wherein at least a part of said button is capable of sliding into and out of said female portion.

12. The apparatus of claim 11, wherein said button has a button ridge to engage a first ridge located in proximity to an upper area of said inner wall for limiting further sliding movement of said button.

13. The apparatus of claim 10, wherein said male portion has at least one cut throughout said male portion so as to be compressible.

14. The apparatus of claim 13, wherein, upon insertion of said male portion into said female portion, at least a part of said male portion frictionally engages at least a part of said inner wall for securely locking said male portion in said female portion.

15. The apparatus of claim 13, wherein said male portion has a head, a body, and a recess located between said head and said body;

said inner wall having a second ridge located in proximity to a mid area of said inner wall, such that, upon insertion of said male portion into said female portion, said head is momentarily compressed to pass said second ridge and, upon passing said second ridge, returns to its approximate original width; and said recess being proportioned to engage said second ridge for securely locking said male portion in said female portion.

16. The apparatus of claim 9, wherein said first snap connector is located in a temple socket attached to each of said temple extensions, and said second snap connector is located in an appendage socket attached to each of appendages of said lens frame.

17. An apparatus for attaching a lens frame to a primary eyewear comprising:

a first snap connector having a male portion;

a second snap connector having a female portion;

said male portion having at least one cut throughout said male portion so as to be compressible, said female portion being configured for receiving said male portion, said female portion being defined by an inner wall of said second snap connector, said inner wall having a protrusion such that, upon insertion of said male portion into said female portion, at least a part of said male portion frictionally engages said protrusion of said inner wall for securely locking said male portion in said female portion, wherein said second snap connector further comprises a button for releasing said male portion from said female portion.

18. The apparatus of claim 17, wherein at least a part of said button is capable of sliding into and out of said female portion.

19. The apparatus of claim 18, wherein said button has a button ridge to engage a first ridge located in proximity to an upper area of said inner wall for limiting further sliding movement of said button.

* * * * *